May 21, 1968        R. B. TUFTS        3,384,066
CHARCOAL BURNER
Filed July 29, 1966        2 Sheets-Sheet 1
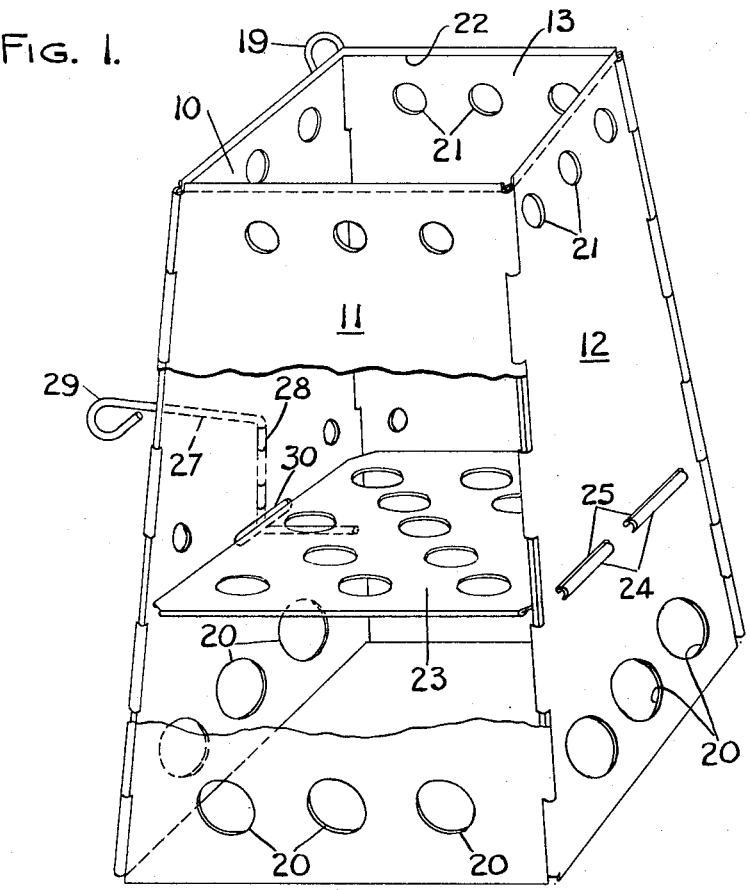
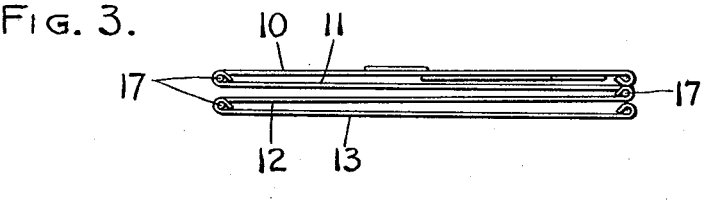
INVENTOR.
RALPH B. TUFTS
BY
*Christel + Bean*
ATTORNEYS May 21, 1968 R. B. TUFTS 3,384,066
CHARCOAL BURNER
Filed July 29, 1966 2 Sheets-Sheet 2
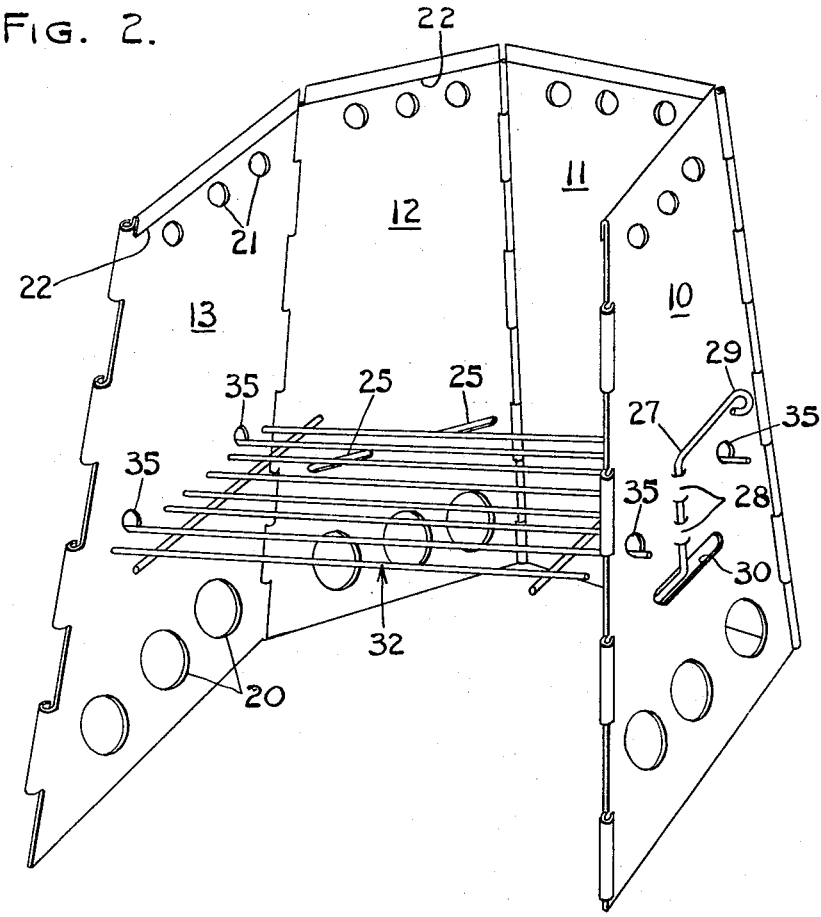
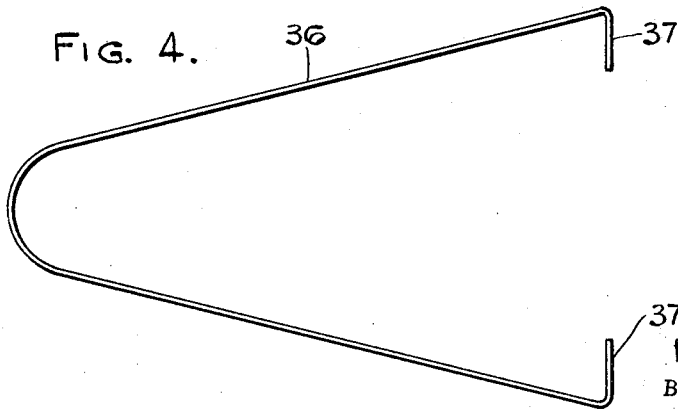
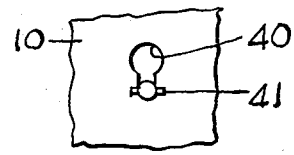
INVENTOR.
RALPH B. TUFTS
BY
*Christel & Bean*
ATTORNEYS

United States Patent Office 3,384,066
Patented May 21, 1968

3,384,066
CHARCOAL BURNER
Ralph B. Tufts, 140 Ivyhurst Road,
Amherst, N.Y. 14226
Filed July 29, 1966, Ser. No. 568,952
4 Claims. (Cl. 126—9)

ABSTRACT OF THE DISCLOSURE

A foldable sheet metal charcoal burner having four trapezoidal side walls which are hinged to form a truncated pyramid with a grate pivoted horizontally against one wall substantially above the base of the pyramid and releasably attached to the opposite wall, whereby the grate may be released to fall and dump the fire. One hinge pin is removable to fold the device or arrange it with the two sides adjacent to the hinge pin parallel with a grill extending between such two sides, whereby the sides form a fire shield and grill support which has an open side.

---

This invention relates to charcoal burners and more particularly to a foldable, highly compact apparatus which may be employed merely to ignite and partially burn a supply of charcoal for use in other apparatus or may be itself used as a charcoal grill or as a protective wind breaker or as a heat reflector.

A variety of charcoal burners and knockdown grills of various kinds have heretofore been proposed. The device of the present invention provides numerous advantages over devices of the prior art, some of which are outlined generally below.

Compactness and ready portability are important requisites of charcoal burners or grills, particularly such as are intended to be used by campers, picnickers and the like. The present invention provides apparatus which folds into a flat compact package when not in use and, what is of paramount importance, the device may be simply erected or set up for use quickly and without special skill or knowledge and, when erected, presents a solid and secure structure for supporting pots, pans or other cooking devices.

When used as a charcoal burner the device of the present invention produces a charge of burning charcoal in a very certain manner and in a short time without the use of dangerous flammable liquids or other starting fuels. It is accordingly very effectively and efficiently employed to ignite and burn a charge of charcoal for use in a charcoal grill, particularly grills which have inadequate draft provisions for starting a charcoal fire, such as the familiar flat bowl type.

An important attribute of the present charcoal burner resides in the ease and economy of manufacture thereof. The four main body components are basically identical which obviously facilitates production and reduces tool costs. Also, the design is such as to avoid expensive blanking and forming dies and assembly of the parts is extremely simple.

When the device of the present invention is itself to be employed as a cooker or grill, a pot may be placed directly atop the apparatus or a grill may be placed thereon for receiving meats or other food articles to be grilled or otherwise cooked.

The device of the present invention includes an elevated grate to support charcoal or other solid fuel and provide adequate draft air flow but the grate may be dumped, not only to discharge the burning coals into a separate grill but also, when desired, to dump the burning coals on the ground within the apparatus for slower burning to grill certain foods more effectively.

Furthermore, the apparatus may be opened out, as will appear later herein, to serve as a shield for burning coals and also, when desired, to afford a larger grill space than during the initial charcoal ignition period. Still other uses of the present device will present themselves, upon a study of the embodiment of my invention illustrated in the accompanying drawing and described in detail in the following specification, and other objects and advantages will likewise become apparent.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

In the drawings:

FIG. 1 is a general perspective view of one form of the charcoal burner of the present invention set up for normal use;

FIG. 2 is a perspective view of the apparatus of FIG. 1 set up for use as a fire shield or to provide an extended grill surface or both;

FIG. 3 is an end elevational view of the device of FIGS. 1 and 2 shown in a flat folded condition;

FIG. 4 is an elevational view of a lifting bail for the device of FIG. 1; and

FIG. 5 is a fragmentary elevational view showing a modified means for mounting the grill member in the general position shown in FIG. 2.

In the drawings like characters of reference denote like parts and the main body of the device depicted therein comprises four similar metallic panels designated 10, 11, 12 and 13. These panels are identical in outline and notching and in the draft openings perforated therein, although some of the panels have additional formations, as will presently appear.

Each of the panels 10 through 13 is generally trapezoidal and has conventional hinge formations along its opposite side edges. The location of the hinge formations of the several panels, that is, the direction in which they are offset with respect to the planes of the panels upon which they are formed, is clearly shown in FIG. 3 and is such as to provide a readily foldable arrangement and one which folds into a preferably flat extremely compact form. Each panel has a row of draft air openings 15 along its lower edge and a further row of openings 16 along its upper edge.

The hinged connections between panels 10 and 11, panels 11 and 12, and panels 12 and 13 may be by means of more or less permanent hinge pins 17. The hinge between panels 10 and 13 is readily connectable and disconnectible by means of a hinge rod or wire 18 having a handle formation 19 at its upper end. When the panels are assembled and set up in the manner illustrated in FIG. 1 they form a truncated pyramid and each of the panels 10 through 13 has a series of draft air openings along its bottom margin as at 20. A further series of openings 21 along the upper margin of each of the panels serves to permit a continuous flow of draft air upwardly through the device even though the upper end may be closed over by a pot or pan. The upper edges of the several panels 10 through 13 are return bent inwardly as at 22 to provide smooth upper edges and to reinforce the panels The use of panels of trapezoidal configuration provides a device of great stability, whether the same is used in the truncated pyramid form of FIG. 1 or in the partially open form illustrated in FIG. 2.

A flat plate member 23 provides a grate for supporting charcoal or other solid fuel and is arranged to be readily attached to the housing structure and is also arranged o be conveniently dumped as required. A pair of downwardly curved hook formations 24 along one edge of grate 23 are readily engaged in slots 25 in panel 12. The remaining three edges of grate 22 are return bent downwardly as at 26 to reinforce the grate and provide smooth edges.

A Z-shaped grate retaining rod member 27 has a medial portion pivoted in vertically extending hinge formations 28 in panel 10 which are best shown in FIG. 2 and has a loop handle formation 29 at its upper outer end. The lower end of retaining members 27 may be freely swung from the grate supporting position shown in FIG. 1 to grate releasing position shown in FIG. 2 wherein member 27 lies substantially flat against panel 10. The lower portion of member 27 swings in a slot 30 in panel 10.

The device erected as shown in FIG. 1 and described thus far may be used merely as a lighter or igniter for charcoal or other solid fuel or also as a stove or cooker. To ignite a charge of charcoal the device is set up on the ground or on a charcoal grill or other surface with the grate in the position shown in FIG. 1 and a supply of charcoal or other solid fuel placed therein on the grate 23. Some crumpled paper (a double sheet of newspaper is adequate) is placed in the space beneath grate 23 and ignited. The draft arrangement described above is such that certain and reliable burning of the solid fuel ensues within a short time without the necessity for using supplementary flammable liquids, fanning or other expedients or makeshifts.

A pot may be placed directly on the upper end of the device of FIG. 1 to heat water or food or the grill designated generally by the numeral 32 in FIG. 2 may be placed hereon to grill food. In the latter case the grate will usually be dumped to slow the burning of the fuel and reduce the heat somewhat.

After the grate is released to dump the coals onto the ground or into a conventional charcoal grill the device may be opened to the position shown in FIG. 2 by removing hinge rod 18. Grill 32 has a series of parallel rods welded to a pair of cross rods and two of the parallel rods are of extended length to project through openings 35 in panels 10 and 13 to support grill 32 above coals which have been dumped on the ground or onto a charcoal grill. If slower heating is desired grill 32 may be placed across the tops of panels 10 and 13 with the device in the position shown in FIG. 2.

In addition to the foregoing uses, the hinged panels in the general position of FIG. 2 may be placed on top of the grill surface of a charcoal grill to serve as a wind shield for food cooking on such grill surface. Also, in this position the device may be used as a heat reflector for a camp fire. FIG. 4 shows a lifting bail 36 having inwardly bent ends 37. The bail is sprung apart to dispose the ends 37 in the center holes 21 of opposite panels when the device is assembled as in FIG. 1 for lifting the device after burning coals have been dumped to the ground or to a grill surface or for moving the stove about after lighting but without dumping the coals.

FIG. 5 shows a modified form of connection between the grill 32 and the walls of the device when used in the general position shown in FIG. 2. In FIG. 5 the openings 40 which correspond to the openings 35 of FIG. 2 are of keyhole shape and the projecting ends of the grill rods are pinched or flattened at their outer ends as indicated at 41. Thus the flattened portions are projected through the larger portions of keyhole openings 40 and the grill is lowered to dispose the projecting grill rods in the narrow lower portions of the keyhole openings 40, whereby the enlarged ends 41 of the grill rods prevent the walls 10 and 13 from being displaced outwardly while the ends of the remaining shorter longitudinal grill rods prevent such walls from being displaced inwardly. This provides a secure and rigid set-up when the device is used as in FIG. 2.

I claim:

1. A burner for solid fuel comprising four similar generally quadrilateral sheet metal wall members hinged to each other along adjacent generally vertical edges to form a four sided enclosure open at its upper and lower ends, a grate member shaped to fit horizontally within said enclosure and having a hinge formation along one edge thereof, one of said wall members being formed to engage releasably with said grate member hinge formation to pivot an edge thereof at an elevation spaced above the lower end of said enclosure, means associated with the wall member opposite to said one wall member for engaging the opposite edge of said grate member to support the same in generally horizontal position, said last-mentioned means being releasable to drop said grate pivotally and dump the fuel burning thereon, one of said hinges being readily releasable for flat folding of said wall members, and a generally rectangular grill and formations in the two wall members adjacent to said releasable hinge for engagement with opposite ends of said grill when said wall members are in a partially open position with said hinge released, with said grate removed, and with said two wall members in substantially parallel relationship.

2. Apparatus according to claim 1 wherein said wall members are of trapezoidal shape whereby said enclosure comprises a truncated pyramid.

3. Apparatus according to claim 1 wherein said wall member formations and said opposite ends of said grill are engageable to secure said two wall members in such parallel relationship.

4. A burner for solid fuel comprising four similar generally quadrilateral sheet metal wall members hinged to each other along adjacent generally vertical edges to form a four sided enclosure open at its upper and lower ends, a grate member shaped to fit horizontally within said enclosure and having a hinge formation along one edge thereof, one of said wall members being formed to engage releasably with said grate member hinge formation to pivot an edge thereof at an elevation spaced above the lower end of said enclosure, means associated with the wall member opposite to said one wall member for engaging the opposite edge of said grate member to support the same in generally horizontal position, said last-mentioned means being releasable to drop said grate pivotally and dump the fuel burning thereon, said last mentioned means comprising a medial upright portion pivoted to said opposite wall member, a leg projecting inwardly from one end of said upright portion to engage beneath the grate member to support the same in horizontal position, and a leg projecting outwardly from the other end of said upright portion and pivotally movable against the outside of said wall member to move said first leg against the inside of said wall member to release said grate member and dispose said last mentioned means approximately coplanar with said wall member.

References Cited

UNITED STATES PATENTS

| | | | |
|---|---|---|---|
| 3,116,704 | 1/1964 | Byars et al. | 110—1 |
| 472,907 | 4/1892 | Patton | 312—262 |
| 1,212,162 | 1/1917 | Green | 126—9 |
| 1,238,142 | 8/1917 | Hitchcock | 126—29 |
| 1,262,210 | 8/1918 | King | 126—9 |
| 3,026,866 | 3/1962 | Lynch | 127—274 |

FOREIGN PATENTS

| | | |
|---|---|---|
| 23,041 | 1914 | Great Britain. |

FREDERICK L. MATTESON, JR., *Primary Examiner.*

E. G. FAVORS, *Assistant Examiner.*